3,418,357
CATALYTIC PROCESS FOR FORMING ACRYLONITRILE
Geir Bjornson and Darrell W. Walker, Bartlesville, Okla., assignors to Phillips Petroleum Company, a corporation of Delaware
No Drawing. Filed Oct. 21 1965, Ser. No. 500,227
8 Claims. (Cl. 260—465.3)

This invention relates to a process for forming acrylonitrile from hydrogen cyanide and acetylene with alkali metal silicate as the catalyst and to a process for forming dehydrated, hard, porous alkali metal silicate catalysts.

Acrylonitrile is an extremely useful polymerizable material. The addition of hydrogen cyanide to acetylene to produce acrylonitrile over a charcoal catalyst impregnated with an alkali metal compound is conventional. However, the charcoal catalyst, while very effective, is not regenerable and must be frequently replaced with freshly prepared catalyst. Obviously, when coke deposits on the catalyst, it must be removed by heating to an elevated temperature in air and this procedure destroys the activity of the charcoal portion of the prior art catalyst. To overcome this deficiency in charcoal catalysts, catalysts which are regenerable, such as silica gels impregnated with alkali metal compounds, have been tried. However, such catalyst compositions have shown either poor conversion activity or poor selectivity to acrylonitrile, or both.

This invention is concerned with the preparation and use of a catalyst in the addition of hydrogen cyanide to acetylene, which catalyst is readily regenerable by heating in air.

Accordingly, it is an object of the invention to provide a process for the formation of acrylonitrile by the addition of hydrogen cyanide to acetylene with a readily regenerable catalyst. Another object is to provide an improved catalyst for the reaction of hydrogen cyanide with acetylene which is highly selective and produces high yields. A further object is to provide a method for preparing a rugged and active alkali metal silicate catalyst particularly useful in the manufacture of acrylonitrile. Other objects of the invention will become apparent to one skilled in the art upon consideration of the accompanying disclosure.

In accordance with the invention, a dehydrated, hard, porous alkali metal silicate is prepared by slowly dehydrating a concentrated aqueous solution of a soluble alkali metal silicate, such as water glass, without melting the silicate so as to preserve the silicate structure and obtain a porous, hard catalyst. Both the sodium and potassium tetrasilicates are readily available commercially. The formula for this class is compounds is $M_2O \cdot SiO_2(x)$ wherein M is an alkali metal and $x$ has a value of 2 to 5. To illustrate, sodium tetrasilicate has the formula $Na_2Si_4O_9$ or, as it is frequently written to illustrate its oxide relationship, $Na_2O \cdot 4SiO_2$. The commerial tetrasilicates are available in the form of a syrupy aqueous solution, the form which is particularly applicable for use in the instant invention.

The alkali metal tetrasilicate solution is converted to a catalytically active material essentially by a process of dehydration which yields a hard, porous material which has a melting point above about 1500° F. The dehydration process is begun preferably by displacing some of the water from the tetrasilicate solution by mixing the silicate with an alcohol of 1 to 5 carbon atoms, preferably methanol. Such contact with an alcohol causes the alkali metal tetrasilicate to precipitate as a white solid. This solid, which still contains substantial quantities of combined water, is then slowly dried, preferably with the aid of reduced pressure, by gradually increasing its temperature at a rate which will not exceed its melting point under its present state of hydration. The melting point of the silicate is slowly elevated by the loss of water. A dehydration can be carried out by slow heating without the alcohol precipitation step, but it is less convenient and the resulting catalyst has not been found to be as active. The final temperature at which the alkali metal tetrasilicate is heated is important and should be in the range of about 900 to about 1500° F. The later phase of the drying, which can be considered the activation step of the catalyst preparation, is preferably carried out in a stream of dry air. The catalyst is maintained in the range of 900 to 1500° F. for 1 to 30 hours. If desired, the catalyst can be sequentially treated with other gases, such as hydrogen, nitrogen, helium, carbon monoxide, and the like, while at an elevated temperature.

It is preferable that the catalyst composition contain two or more alkali metal ions, and this can be accomplished by introducing such ions to the alkali metal tetrasilicate before the dehydration process. Thus, such compounds as the carbonates of potassium, rubidium, or cesium, can be blended in with a sodium tetrasilicate solution before contact with the methanol. The starting material can also be a mixture of potassium tetrasilicate and sodium tetrasilicate. In addition to alkali metal ions, other metallic ions, such as bismuth, which are known to have a promotional effect on the reaction, can be added at this point as well.

The hydrogen cyanide can be contacted with the acetylene in the presence of the catalyst using any conventional contacting apparatus. Both fixed bed operations and fluidized bed operations are suitable. The contacting is carried out within the broad temperature of from 650 to about 1000° F., at any convenient pressure, including atmospheric pressure.

High gaseous hourly space velocities promote the desired reaction to some degree but at the expense of lower conversions of the feed materials. Generally, however, the gaseous hourly space velocities will be in the broad range of about 50 to about 1500 v./v./hr. The ratio of hydrogen cyanide and acetylene in the feed stream can vary over a wide range but will generally approximate the stoichiometric proportions. An excess of acetylene is sometimes beneficial. Other gases such as hydrogen or inert gases such as nitrogen can also be present in the feed stream.

The effluent from the reaction zone can be treated conventionally to isolate the acrylonitrile. For example, the acrylonitrile can be recovered by water washing the effluent stream. Unconverted hydrogen cyanide and acetylene can be recycled if desired. Other nitrile byproducts which are obtained in varying degrees from this process are acetonitrile and propionitrile.

The invention is illustrated by the following examples.

Example I

A 150 ml. quantity (200 g.) of water glass (containing 29.2 weight percent $SiO_2$ and 8.9 weight percent $Na_2O$ was mixed with 50 ml. of a $K_2CO_3$ solution containing 106 g. $K_2CO_3/l$. This solution was then stirred into a quantity of methanol resulting in the formation of a white precipitate. The supernatant liquid was decanted and the solids were slowly dried in a vacuum oven by gradually increasing the temperature to 360° F. over a period of about 36 hours. The resulting solid material was ground and sieved to a 10–20 mesh size and then charged into a catalyst activator tube. The granular material was then slowly heated in a stream of dry air until a temperature of 900° F. was reached. The catalytic material was maintained at that temperature for 1 hour. The dried, agglomerated material was ground and screened into a 10–48 mesh size for use in a subsequent fixed catalytic bed test. A 0.6591 g. quantity of the above prepared catalyst, containing 2.7 weight percent K and 13 weight percent Na, was charged into a tubular fixed bed reactor and further conditioned by heating at 920° F. in a stream of flowing hydrogen for about 16 hours.

A feed stream containing 4.35 mole percent hydrogen cyanide, 11.0 mole percent acetylene, with the remainder being hydrogen was then passed through the catalytic bed at a gaseous hourly space velocity of 443 v./v./hr., at a temperature of 930° F., and at near atmospheric pressure in a test run which extended 8.5 hours. During the run, 0.0211 g. of coke was formed and 0.2969 g. nitriles was recovered. The conversion of the feed to nitrile products at 2 hours, 3 hours, 4 hours, and 8.5 hours was 55 percent, 50 percent, 42 percent, and 28 percent, respectively. Sampling and testing the product produced in the first 2 hours of the run showed that the nitrile product consisted of about 97 mole percent acrylonitrile. The product obtained from the last several hours of the run also had a purity of about 97 percent.

Example II

As a comparison, hydrogen cyanide and acetylene were converted by passing over a conventional silica gel which had been impregnated with sodium and potassium compounds.

A 20 g. quantity of Davison ID silica gel was slurried with a solution containing about 100 g. water and 2½ g. each of sodium cyanide and potassium cyanide. The mixture was dried on a hot plate, and activated in dry flowing air for 1 hour at 1200° F. The catalyst composite was found to contain 5.5 weight percent Na and 6.08 weight percent K.

A 0.80 g. quantity of this catalyst was charged into the tubular fixed bed reactor of Example I and conditioned overnight with hydrogen at 920° F. A feed stream containing 11.17 mole percent acetylene, 4.31 mole percent hydrogen cyanide, and the remainder hydrogen was passed through this catalytic bed at 930° F., about atmospheric pressure, and at a space velocity of 300 v./v./hr. in a test which lasted 6 hours. A 0.02 g. quantity of coke was produced and 0.0455 g. total nitriles were recovered. The conversion of the feed at 4 hours and 6 hours was 14 percent and 11 percent, respectively. The purity of the product recovered from the run was found to be about 87 percent acrylonitrile.

Example III

Still another variety of commercial silica gel was tested as a comparison.

A 20 g. quantity of microspheroidal Davison silica gel was impregnated and activated in the same manner as that of Example II. The catalyst compound was found to contain 6.5 weight percent Na and 8.7 weight percent K.

A 0.55 g. quantity of the above prepared catalyst was charged into the tubular fixed bed reactor and conditioned in a flow of hydrogen at 920° F. for about 16 hours. The catalytic bed was contacted with a feed stream containing 3.70 mole percent hydrogen cyanide, 10.50 mole percent acetylene, and the remainder hydrogen at essentially atmospheric pressure, 930° F., and at a space rate of 365 v./v./hr. in a run which lasted for 7 hours. A 0.03 g. quantity of coke was found and 0.0106 g. nitriles was recovered. The conversion at 1 hour, 2 hours, 3 hours, and 3.7 hours was 0 percent, 0 percent, 10 percent, and 8 percent, respectively. The purity of the nitriles obtained during this run was about 90–95 acrylonitrile.

The comparison of the conversions obtained as well as the purity of the product produced in Example I showing the present invention and Examples II and III readily show that the dehydrated alkali metal tetrasilicate is capable of producing acrylonitrile more efficiently. The 97 percent purity obtained in Example I was essentially unmatched by the corresponding catalysts prepared from conventional silica gels under comparable conditions. Moreover, the catalyst of the invention of Example I was capable of greater conversions of the feed stock.

Certain modifications of the invention will become apparent to those skilled in the art and the illustrative details disclosed are not to be construed as imposing unnecessary limitations on the invention.

We claim:

1. A process for making acrylonitrile which comprises reacting within a temperature range from about 650° to about 1000° F., a mixture of hydrogen cyanide and acetylene in the presence of a catalyst prepared by (1) forming a mixture of (a) an aqueous solution of alkali metal tetrasilicate which is at least one of sodium tetrasilicate or potassium tetrasilicate, and (b) an alkanol of 1–5 carbon atoms so as to precipitate the tetrasilicate; (2) dehydrating said precipitated tetrasilicate by gradually increasing the temperature thereof to at least 900° to about 1500° F. without melting said tetrasilicate so as to form a hard, porous catalyst; and (3) comminuting the resulting catalyst to the desired particle size for catalytic conversion.

2. The process of claim 1 wherein said reacting is carried out by passing said mixture over said catalyst at a gaseous hourly space velocity of about 50 to about 1500 v./v./hour.

3. The process of claim 1 wherein said dehydrating step (2) comprises heating said tetrasilicate under vacuum to a temperature in the range of about 300 to 450° F., comminuting the resulting partially dehydrated tetrasilicate to a small particle size, and further dehydrating the resulting small particles in a stream of dry air gradually increased to the final temperature.

4. The process of claim 1 wherein said alkali metal tetrasilicate is sodium tetrasilicate.

5. The process of claim 1 wherein said alkali metal tetrasilicate is potassium tetrasilicate.

6. The process of claim 1 wherein said alkali metal tetrasilicate is both tetrasilicate and potassium tetrasilicate.

7. The process of claim 4 wherein said aqueous solution contains potassium carbonate.

8. The process of claim 1 wherein said alkanol is methanol.

References Cited

UNITED STATES PATENTS 2,414,762  1/1947  Owen et al. _____ 260—465.3
2,998,443  8/1961  Kianpour et al. _____ 260—465.3

JOSEPH P. BRUST, *Primary Examiner.*

U.S. Cl. X.R.

23—110